United States Patent [19]

Bschorr et al.

[11] 4,133,157

[45] Jan. 9, 1979

[54] DAMPER FOR SOUND CONDUCTED IN SOLIDS

[75] Inventors: Oskar Bschorr, Munich; Helmut Albrecht, Weyarn, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 747,537

[22] Filed: Dec. 6, 1976

[30] Foreign Application Priority Data

Dec. 13, 1975 [DE] Fed. Rep. of Germany ....... 2556297

[51] Int. Cl.² .............................................. E04B 1/98
[52] U.S. Cl. ...................................... 52/403; 52/167; 52/727; 52/144; 188/1 B
[58] Field of Search ................. 52/403, 393, 167, 144, 52/727, 729; 188/1 B

[56] References Cited

U.S. PATENT DOCUMENTS

| 3,078,969 | 2/1963 | Campbell et al. | 52/403 |
| 3,078,971 | 2/1963 | Wallerstein | 52/403 |
| 3,088,561 | 5/1963 | Ruzicka | 52/727 |
| 3,601,228 | 8/1971 | Nashif | 188/1 B |
| 3,612,222 | 10/1971 | Minor | 188/1 B |
| 3,876,034 | 4/1975 | Antonini | 188/1 B |

FOREIGN PATENT DOCUMENTS

| 60769 | 4/1939 | Norway | 52/403 |
| 440509 | 4/1975 | U.S.S.R. | 52/727 |

*Primary Examiner*—J. Karl Bell
*Attorney, Agent, or Firm*—W. G. Fasse; W. W. Roberts

[57] ABSTRACT

A damper for sound conducted or propagating in solids is constructed to especially damp oscillations or vibrations of the bending type particularly in plates, housings, girders, rails, rods, etc. The damper is connected to the structural member to be damped in such a manner that the damping force is taken up by the structure member itself. For this purpose a damping element having a high rigidity against bending is secured longitudinally to a structural member to be damped. The structural member and the element form the damping unit. Due to the high flexural rigidity, the damping element behaves like a solid platform or a fixed point, such that vibrations of the structural member cause a relative motion between the structural member and the damping element. This relative motion provides excellent damping characteristics which may even be improved by placing a viscous damping material between the structural member and the element.

12 Claims, 6 Drawing Figures

U.S. Patent  Jan. 9, 1979  4,133,157
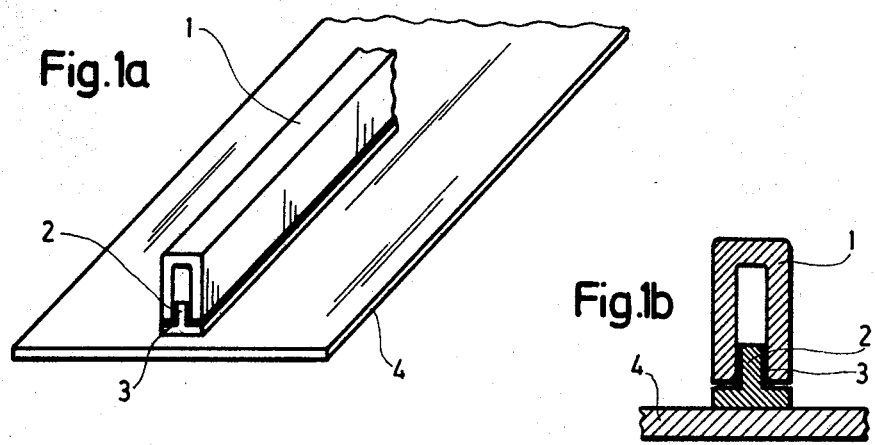
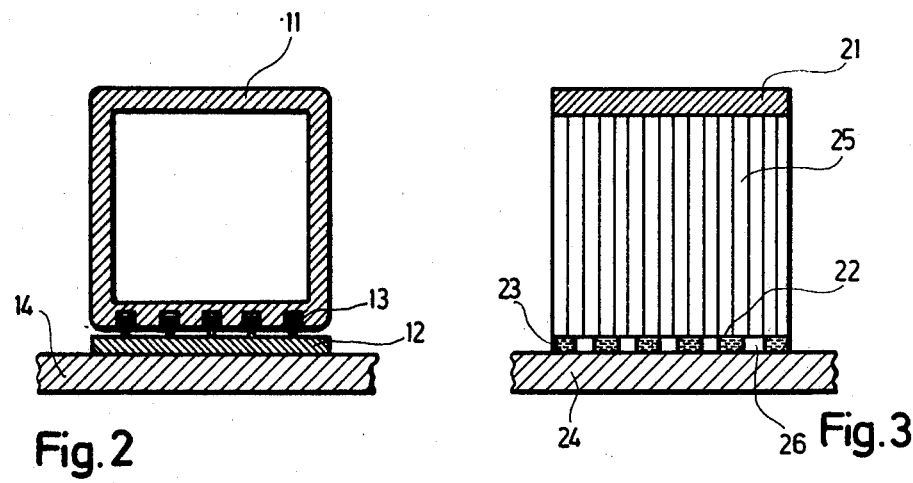
Fig. 2
Fig. 3
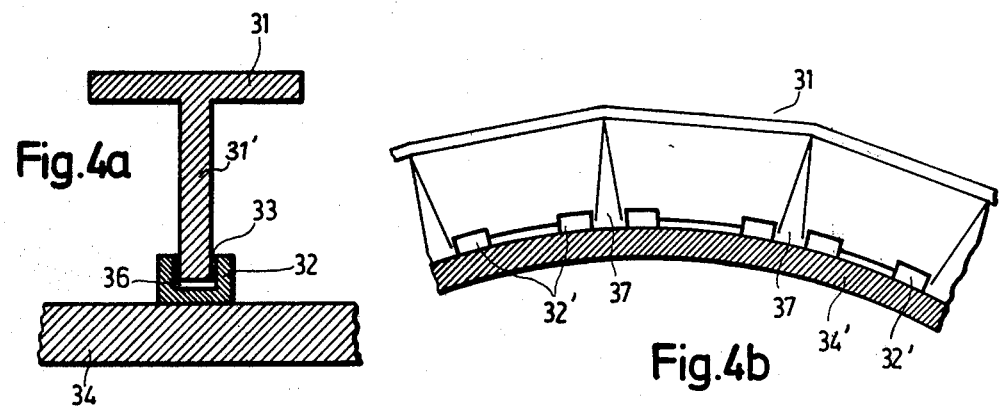
Fig. 4a
Fig. 4b

DAMPER FOR SOUND CONDUCTED IN SOLIDS

BACKGROUND OF THE INVENTION

The invention relates to a damper for damping sound vibrations occurring in solids, especially in structural members, more specifically, the invention relates to dampers capable of damping flexural or bending vibrations.

A number of measures are known for the damping of vibrations occurring in machines and structural members. Anti-noise linings or coatings belong to the most familiar of these measures, whereby bending vibrations are damped or attenuated in a highly viscous layer by stretching such a layer. Such anti-noise coatings produce outstanding damping values in connection with thin walls. However, as the mass and size of the structural members increases, the problems presented by the application of the coatings also increase, resulting in a need for counter plates.

An equally well known way of damping vibrations is the use of sand fillings. However, high vibration levels cause a compression and agglomeration of the sand fill, so that the damping mechanism becomes less effective and eventually disappears. Another typical group of vibration damping means includes resonance absorbers and so-called oscillation quenchers which require a seismic mass to amplify the damping force.

OBJECTS OF THE INVENTION

In view of the foregoing, it is the aim of the invention to achieve the following objects, singly or in combination:

to provide a damper for sound or noise vibrations in solids, particularly for the damping or bending vibrations in plates, housings, girders, rails, and the like;

to arrange the damper in such a manner that the damping force is taken up by the structural member itself;

to increase the damping force by the utilization of viscous intermediate layers between a damper, especially a bending stiff damper, and the structural member;

to avoid resonance and coincidence effects, for example, by segmenting the damping element thus facilitating the fitting of the damping element to uneven surfaces;

to provide a step or discontinuity in the impedance of a damping element to also facilitate its fitting to uneven surfaces of structural members; and to improve the damping characteristics of dampers without the use of viscous intermediate layers.

SUMMARY OF THE INVENTION

According to the invention there is provided a damper for sound conducted in solids wherein a damping element having a high stiffness against bending moments is arranged alongside and in contact with the structural member, such as plates, housings, girders, rails, rods and the like, to form a damping unit. Due to the fact that the damping element has a high flexural rigidity, excellent damping characteristics result since the element acts as a fixed platform or fixed (Archimedes) point, whereby a relative motion between the structural member and the damping element is caused by vibrations, said relative motion providing said good damping characteristics.

The damping characteristics may be further improved in accordance with the invention, by placing a viscous damping material between the structural member and the damping element, said structural member contacting both the member and the element. Preferably, the damping element should have a length corresponding to the wave length of the vibration to the damped in order to assure an optimum stability of the damping element. In order to avoid resonance and coincidence, it is necessary that the velocities of the flexural waves in the structural member and in the damping element must differ from each other.

According to a further feature of the invention the damping element is divided into a plurality of segments to avoid resonance effects. Resonance may also be avoided by any measure causing a step or discontinuity in the impedance of the damping element. Such discontinuity may, for example, be caused by changes in the cross-section and/or in changes in the stiffness of the damping element. Such features simultaneously improve the adaptability of the damping element to structural members having uneven contours.

According to a further feature of the invention, the damping force may be applied by the use of an intermediate coulomb or dry friction between solids without employing viscous intermediate layers. In this embodiment the damping element is provided with a footing which is secured to the structural member.

BRIEF FIGURE DESCRIPTION:

In order that the invention may be clearly understood, it will now be described by way of example with reference to the accompanying drawings, wherein:

FIG. 1a shows a damping arrangement secured to a plate forming the structural member;

FIG. 1b is a sectional view through the damping arrangement of FIG. 1a along a section plane extending perpendicularly to the longitudinal axis of the damping arrangement;

FIG. 2 shows a sectional view through a damper with a rectangular rail;

FIG. 3 shows a damper with a spacer mounting of the honeycomb-spacer type;

FIG. 4a is a sectional view of a damper using a T-rail as a damping element; and FIG. 4b illustrates a side view of a damper with indentations or notches to facilitate the shaping of the damper element to conform to the contour of a structural member.

DETAILED DESCRIPTION OF PREFERRED EXAMPLE EMBODIMENTS:

FIGS. 1a and 1b illustrate a damping unit for vibrations propagating in solids. FIG. 1a shows a perspective view while FIG. 1b shows a section through the structural member to be dampened by an element having a high flexural rigidity. The damping element 1 is, for example, a rigid U-rail having a base or footing 2. A viscous damping coating 3 is located between the U-rail 1 and base 2. A direct mounting or clamping of the U-rail 1 to the base 2 may be used thereby avoiding the viscous damping coating, whereby the damping occurs due to solid-body friction. The base or footing is advantageously fastened to the structural member 4 by force transmitting means, not shown but well known, e.g., welding. When vibrations occur in the structural member 4 a relative motion will be caused in the damping coating 3. The length of the U-rail 1 should be greater than the wave length of the oscillations to be damped.

The vibration damper of FIG. 2 is essentially identical to the embodiment of FIG. 1. A hollow, rectangular section or rail is employed as the damping element 11. The rail 11 is profiled at its underside, as is the base 12 at its upper side. The respective male and female profiles fit into each other. A viscous damping means 13 is located between the profiles so that the relative motions of the rail 11 and the base 12 will be transmitted to the vibration damper 13 by shearing friction. The base 12 is secured in a force transmitting manner to the structural member 14 which is to be damped. The base 12 and the damping element 11 are interlocked in a comb fashion as shown in FIG. 2.

FIG. 3 shows a damper including a cover rail 21, a spacer support 25, for instance, a honeycomb structure, a substratum 22, and the viscous damping means 23. The viscous damping means function, simultaneously, as an adhesive between the substratum or layer 22 and the structural member 24. In order to achieve force transmittal exclusively by friction, equalizing spaces 26 are located in the damping means 23. The advantage of this arrangement is seen in that the combination of the cover rail 21 and the spacer support 25 exhibits a high flexural rigidity. In addition, a special reinforcement of the layer 22 may be avoided, because the stability of the layer 22 is derived from the damping means 23 and the structural member 24.

The damping element 31 of FIG. 4a is constructed as a T-section. The vertical leg 31' of the element 31 is secured in a U-base 32 which is fastened in a force transmitting manner to the structural member 34 that is to be damped. A viscous coating 33 is located between the element 31 and the base 32. In order to transmit frictional forces exclusively, equalizing spaces 36 are provided in the coating 33.

In FIG. 4b, the leg portion 31' of the damping element 31 is provided with indentations or notches 37, so that despite its high flexural rigidity, it may be attached with ease to an uneven surface of a structural member, for example, to the curved surface 34'. For this purpose, the base 32' is not continuous, but instead, it is formed in an interrupted manner to accommodate the interrupted damping element.

When damping structural members of substantial surface areas, it is practical to arrange the noise dampers in a grid-form over a large area. It is advantageous to arrange the damping elements in a non-parallel configuration.

Although the invention has been described with reference to specific example embodiments, it is to be understood that it is intended to cover all modifications and equivalents within the scope of the appended claims.

The viscous damping material between the structural member and the element may be an anti-noise e.g. coating on the basis of tar or bitumen.

What is claimed is:

1. A sound damper comprising a solid structural member, damping means including a longitudinal damping element arranged alongside and in contact with said structural member, said longitudinal damping element having a high flexural rigidity, and means securing said longitudinal, rigid damping element to said structural member thereby forming a damping unit, said securing means connecting said longitudinal, rigid damping element in a force transmitting manner to the structural member, whereby the damping is accomplished by solid body friction between the structural member and the longitudinal, rigid damping element, said damper further comprising viscous damping means operatively arranged between the structural member and the longitudinal, rigid damping element as well as base means secured to the structural member, said viscous damping means being arranged between said base means and said longitudinal, rigid damping element which is held in position by said base means.

2. The damper of claim 1, wherein said longitudinal, rigid damping element comprises impedance interrupting means therein for avoiding resonance and coincidence effects.

3. The damper of claim 1, wherein said longitudinal, rigid damping element comprises a plurality of sections, and bendable joints between adjacent sections, whereby the longitudinal, rigid damping element may be shaped to conform to the surface of the structural member.

4. The damper of claim 1, wherein said longitudinal, rigid damping comprises a plurality of damping sections interconnected to form a grid structure.

5. The damper according to claim 1, wherein said longitudinal, rigid damping element is connected to the structural member at spaced points along the damping element.

6. The damper according to claim 1, further comprising base means securing said longitudinal, rigid damping element to said structural member at spaced points along the structural member and at spaced points along the damping element.

7. A sound damper comprising a solid structural member, damping means including a longitudinal damping element arranged alongside and in solid-body friction contact with said structural member, said longitudinal damping element having a high flexural rigidity, and means securing said longitudinal, rigid damping element to said structural member thereby forming a damping unit, said securing means connecting said longitudinal, rigid damping element in a force transmitting manner to the structural member, whereby the damping is accomplished by solid body friction between the longitudinal, rigid damping element and said structural member, said longitudinal, rigid damping element further comprising impedance interrupting means therein for avoiding resonance and coincidence effects.

8. A sound damper for damping sound propagating in a solid comprising a wall type structural member forming said solid, a longitudinal sectional damping element having a cross-section which provides a high flexural rigidity, said sectional damping element having a length greater than the wave lengths of said sound to be dampened, a sectional base member rigidly connected to said structural member along the length of the sectional base member, said sectional damping element and said sectional base member comprising interfitting means for mounting the sectional damping element along its length through said sectional base member to said structural member, whereby said damping occurs due to solid body friction between said structural member and said sectional damping element through said sectional base member.

9. The sound damper of claim 8, wherein said sectional damping element is a U-rail and said sectional base member is a T-rail whereby said interfitting means comprise the space between the legs of the U-rail and the upright leg of the T-rail which upright leg fits into said space.

10. The sound damper of claim 8, wherein said sectional damping element is a T-rail and wherein said sectional base member is a U-rail, said T-rail fitting with its upright leg into the space between the legs of said U-rail which is secured to said structural member so that its legs extend away from said structural member.

11. The sound damper of claim 8, wherein said sectional damping element is a hollow tube, and wherein said sectional base member is substantially flat.

12. The sound damper of claim 11, wherein said hollow tube has a substantially square cross-section and groove means outwardly facing in one wall of said square cross-section, said substantially flat base member having ridge means fitting into said groove means.

* * * * *